United States Patent [19]

Giamati

[11] Patent Number: 5,634,800
[45] Date of Patent: Jun. 3, 1997

[54] SLIDING CONTACT FOR A PROPELLER ICE PROTECTION SYSTEM

[75] Inventor: Michael J. Giamati, Akron, Ohio

[73] Assignee: The B. F. Goodrich Company, Akron, Ohio

[21] Appl. No.: 235,828

[22] Filed: Apr. 29, 1994

[51] Int. Cl.⁶ .................................................. H01R 39/10
[52] U.S. Cl. ........................ 439/22; 310/232; 244/134 D
[58] Field of Search ....................... 439/13–30; 310/232; 244/134 D

[56] References Cited

U.S. PATENT DOCUMENTS

| | | | |
|---|---|---|---|
| 4,136,295 | 1/1979 | Sweet | 310/239 |
| 4,386,749 | 6/1983 | Sweet et al. | 244/134 D |
| 5,020,741 | 6/1991 | Ziegler et al. | 244/134 D |
| 5,479,060 | 12/1995 | Giamati et al. | 310/232 |

OTHER PUBLICATIONS

BF Goodrich Co., Ice Protection Systems Division, "Slip Ring Material Review and Suggestions", Jul. 29, 1991, 2 pages.

National Electrical Carbon Corporation, "The National Brush Digest", cover and p. 1., Operating Conditions, Chapter 11, pp. 50–56.

Union Carbide Corporation, W. C. Kalb & F. K. Lutz, "Carbon Brushes for Electrical Equipment", Chapter 3, pp. 20–21.

"Effects of Humidity and of Impurities in the Atmosphere on the Behaviour of Brushes", Oil And Grease, pp. 10–12.

National Electrical Carbon Corporation, "Electrical Products", Grade Data Sheet, 1 page.

Primary Examiner—Gary F. Paumen
Attorney, Agent, or Firm—Kevin L. Leffel

[57] ABSTRACT

An improved sliding contact for use with a propeller ice protection system is provided. According to an aspect of the invention, a silver graphite brush forms a sliding contact with a hardened copper alloy slip ring. A sliding contact according to the invention demonstrates improved performance in an oil contaminated environment.

45 Claims, 5 Drawing Sheets

SLIDING CONTACT FOR A PROPELLER ICE PROTECTION SYSTEM

BACKGROUND OF THE INVENTION

This invention relates to an improved sliding contact for conducting electrical power from a fixed power system to a rotating ice protection system. The invention is especially adapted for use with an aircraft propeller ice protection system.

The hazards of aircraft flight in atmospheric icing conditions are well known. Through the years, various workers in the art have developed various techniques for removing or preventing ice accumulation encountered during flight. Certain of the techniques are particularly adapted to protect specific parts of an aircraft. An electrothermal propeller de-icing system is an example of a specialized system.

In an electrothermal propeller de-icing system, electrothermal de-icers are bonded to the inboard leading edge portions of the individual blades of an aircraft propeller. An example of an electrothermal propeller de-icer is presented in U.S. Pat. No. 4,386,749 issued Jun. 7, 1983 to Sweet et al. (the '749 patent). Electrical power is supplied to the individual de-icers through flexible wire harnesses that act as jumpers between each blade and the propeller bulkhead. The harnesses must be flexible since each blade must be able to rotate about its axis in order to effectuate pitch changes. An example of a wire harness is presented in U.S. Pat. No. 5,020,741, issued Jun. 4, 1991, to Ziegler et al. (the '741 patent).

Electrical power is conducted to the propeller ice protection system through a sliding contact comprising a slip ring assembly and a brush assembly. A typical arrangement is presented in U.S. Pat. No. 4,136,295, issued Jan. 23, 1979, to Sweet (the '295 patent). The slip ring assembly is mounted to the back of the propeller bulkhead facing the aircraft engine. According to a very common embodiment, the slip ring assembly includes a metal dish having an annular channel that receives a plurality of conductive slip rings formed from a copper alloy. The rings are potted into the channel with an epoxy compound which also provides the necessary dielectric insulation between the individual rings and the channel. The wire harnesses are electrically connected to the individual rings. In such manner, electrical power is transferred from the slip rings to the individual de-icers.

Electrical power is transferred to the slip rings through a brush assembly. A particular system may have one or more brush assemblies. Each assembly typically includes a housing that slidably receives two or more electrical brushes. The brushes are normally composed of a carbon based matrix. Carbon brushes and various carbon based brush compounds are well known in the brush and commutation art. A spring biases each brush against a slip ring thereby forming a sliding contact. Some form of electrical power connection is attached to the housing. The power connection connects the brush assembly to the aircraft power system and may take the form of a shell-type connector or a number of a individual studs. The aircraft power system typically includes a timing and switching device that switches power supply from brush to brush which thereby switches power to the various de-icers in a predetermined timed sequence. Flexible shunts conduct electrical power from the power connection to each brush. The electrical power is then conducted from the brush through the sliding contact into the slip ring.

There are many brush manufacturers that have developed a variety of brush compounds for a variety of applications. There are five basic categories of brushes: carbon, carbon-graphite, electrographite, graphite, and metal-graphite. The term "carbon" has a broad meaning that refers to any brush having any quantity of carbon in it regardless of the quantity of other materials. The term also has a narrower meaning to refer to a brush predominantly composed of amorphous carbon such as petroleum coke. Carbon-graphite refers to a brush composed of a mixture of carbon (as defined above) and graphite. Electrographite refers to a brush composed of carbon subjected to intense heat in an electric furnace that graphitizes the carbonaceous binder. Graphite refers to a brush that is predominantly graphite mined from the ground or manufactured in an electric furnace. Metal-graphite refers to graphite brushes having a quantity of metal such as silver or copper.

Likewise, slip rings formed from various materials are known in the art. Such materials include gunmetal according to ASTM B143-1A or 1B (88% copper, 8% tin, 4% zinc), leaded gunmetal according to ASTM B144-3D (86% copper, 7% tin, 5% zinc, 2% lead), phosphor bronze (commonly 90% copper, 10% tin, 0.4% phosphorus), cupro-nickel (94% copper, 4% nickel, 2% tin), monel (29% copper, 68% nickel, 3% combination of carbon, iron and manganese), steel (usually 0.21% carbon or 1% carbon and 1% chromium), and stainless steel (18% chromium, 8% nickel or 25% chromium, 12% nickel or 17% chromium, 10% nickel).

There are many combinations of brush and slip ring material possible. Regardless of the combination, formation of a slip ring surface film on the slip ring is regarded as crucial for sliding contact performance. The slip ring surface film includes three layers. The first layer is an oxide layer overlying the slip ring surface. The second layer is a graphitic film overlying the oxide layer. The third layer is a layer of free particles and absorbed water vapor. Unacceptable brush and slip ring wear results if a slip ring surface film does not form. This problem is particularly severe at high altitudes where the sliding contact encounters rarified atmosphere, extremely low humidity, and sub-zero temperatures. These conditions severely impede formation of a slip ring surface film. Special brush compounds for high altitude applications were developed in response to this problem. These compounds have ingredients that maintain performance of the sliding contact at high altitudes.

A metal-graphite brush in combination with a copper alloy slip ring is generally preferred in the industry for use in a propeller ice protection system. The brush metal is usually silver or copper. According to a known combination, a silver-graphite brush impregnated with about 31% silver forms a sliding contact with an electrolytic tough pitch copper slip ring according to Copper Development Association C11000. The slip ring has a surface hardness on the order of a Rockwell F40-F55. Hardened slip rings have also been used in the art.

Brush and slip ring wear in propeller ice protection system applications tends to be more severe than in other sliding contact applications. Some aircraft have exhibited more of a problem with slip ring wear than others. The source of the problem has been elusive. Brush and slip ring wear can seriously shorten the life of a sliding contact in a propeller ice protection system, and can greatly increase maintenance costs. Therefore, a sliding contact having minimized brush and ring wear is desired for propeller ice protection system applications.

SUMMARY OF THE INVENTION

According to an aspect of the invention, a device is provided for transferring electrical power from an electrical power supply mounted on an aircraft to an electrical load mounted on an aircraft propeller, comprising:

a slip ring assembly configured for attachment to the aircraft propeller, the slip ring assembly having a plurality of slip rings comprised of a copper alloy having a surface hardness of at least a Rockwell B60, the plurality of slip rings being adapted to be electrically connected to the electrical load; and, a brush assembly configured for attachment to the aircraft, the brush assembly having a plurality of electrically conductive brushes for conducting electrical power to the slip rings with at least one brush per slip ring, each brush being comprised of a carbonaceous matrix impregnated with silver on the order of 45% to 70% by weight, a plurality of springs with at least one spring per brush for urging each brush against a slip ring, a housing with a plurality of apertures for receiving the plurality of springs and for slidably receiving the plurality of brushes in alignment with the slip rings, a plurality of electrical connectors attached to the housing for connection with the power supply with at least one electrical connector corresponding to each slip ring, and a plurality of flexible shunts with at least one flexible shunt per brush that electrically connects each brush that aligns with a single slip ring to the electrical connector corresponding to that slip ring.

According to another aspect of the invention, an apparatus is provided for propelling an aircraft through atmospheric icing conditions, comprising:

propeller drive means mounted to the aircraft for driving an aircraft propeller;

an aircraft propeller driven by the propeller drive means;

ice protection means mounted to the propeller for conserving propeller performance in atmospheric icing conditions;

an electrical power supply mounted to the aircraft;

a slip ring assembly mounted to the aircraft propeller having a plurality of slip rings comprised of a copper alloy having a surface hardness of at least a Rockwell B60, the plurality of slip rings being electrically connected to the ice protection means; and, a brush assembly mounted to the aircraft proximate the propeller drive means and facing the slip ring assembly, the brush assembly having a plurality of brushes comprised of a carbonaceous matrix impregnated with silver on the order of 45% to 70% by weight, the plurality of brushes being electrically connected to the electrical power supply, and means for biasing the plurality of brushes in contact with the plurality of slip rings.

According to another aspect of the invention, a sliding contact is provided for conducting electrical power from an electrical power supply mounted on an aircraft to a propeller having an electrical load, comprising:

a slip ring comprised of a copper alloy having a hardness of at least a Rockwell B60, the slip ring being adapted to attach to the propeller and conduct electrical power to the electrical load; and, a brush comprised of a carbonaceous matrix with a silver content on the order of 45% to 70% by weight, the brush being adapted to receive electrical power from the power supply, the brush forming a contact with the slip ring that conducts electrical power from the brush to the slip ring during sliding movement of the slip ring relative to the brush while being subjected to oil contamination.

According to another aspect of the invention, a method is provided for conducting electrical power from an aircraft to an electrical load mounted on a propeller, comprising the steps of:

conducting electrical power to a plurality of brushes slidably received within a brush assembly mounted to the aircraft facing a slip ring assembly mounted to the propeller at a location subjected to oil contamination, the plurality of brushes being comprised of a carbonaceous matrix with a silver content on the order of 45% to 70% by weight, the slip ring assembly having a plurality of slip rings comprised of a copper alloy having a surface hardness of at least a Rockwell B60, the brush assembly having biasing means for biasing the plurality of brushes against the plurality of slip rings thereby forming a plurality of sliding contacts;

conducting electrical power from the plurality of brushes to the plurality of slip rings through the plurality of sliding contacts; and, conducting electrical power from the plurality of slip rings to the electrical load.

DETAILED DESCRIPTION

Figure 1:
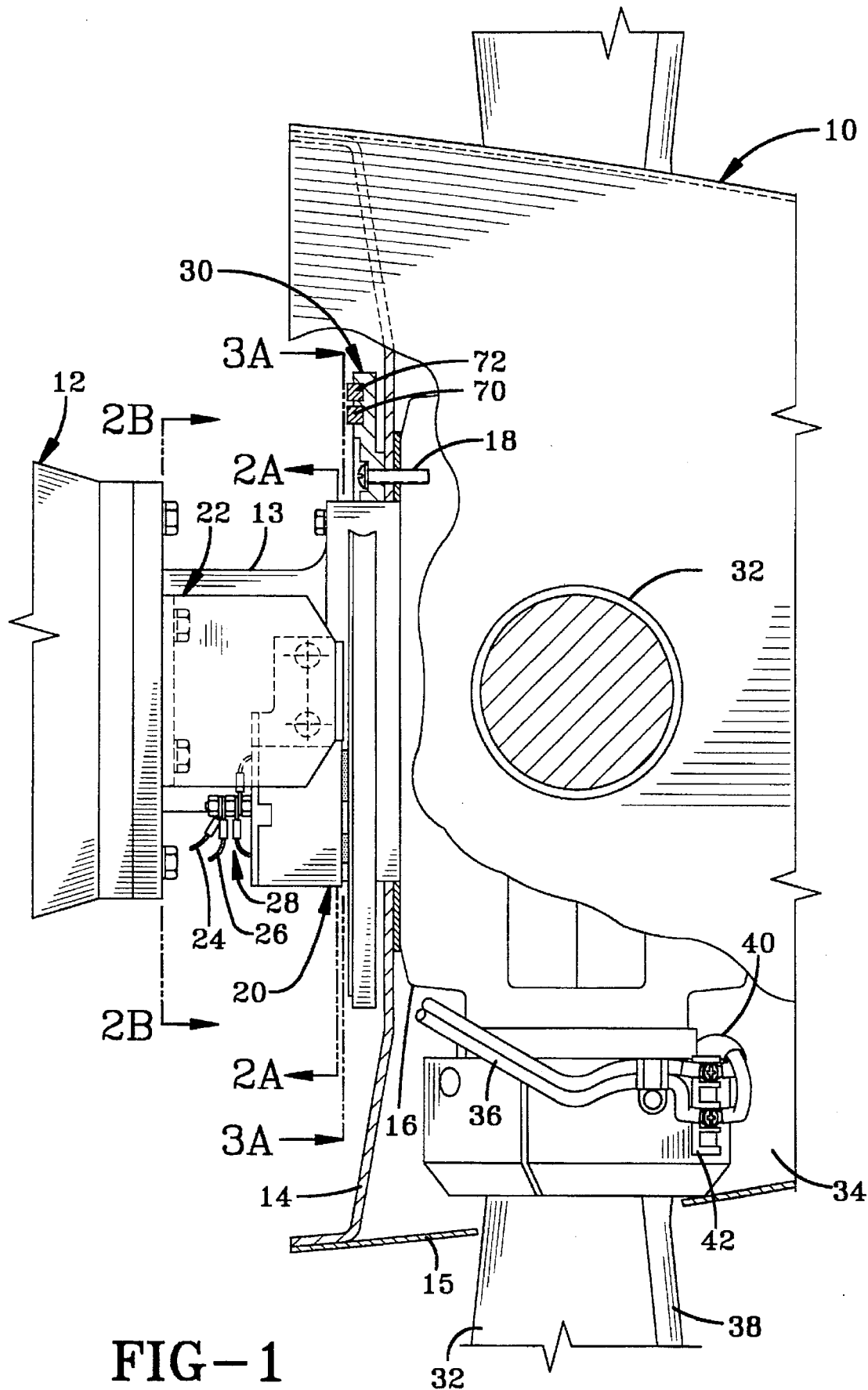
FIG. 1 presents a schematic general arrangement view of an electrothermal propeller de-icing system having a brush assembly according to the invention.

Referring to FIG. 1, an propeller apparatus adapted to propel an aircraft through atmospheric icing conditions is presented. A propeller assembly 10 is shown attached to an aircraft engine 12. A brush assembly 20 according to the invention is shown attached to a mounting bracket 22 proximate the front of the engine 12. Engine 12 acts as the propeller drive means which may be any arrangement known in the art for driving a propeller. Electrical leads 24 and 26 from an electrical power supply (not shown) that is mounted to the aircraft are attached to an electrical power connection 28 attached to the brush assembly 20. A slip ring assembly 30 configured for attachment to the propeller faces the brush assembly 20. The manner in which power is conducted from the electrical power connection 28 through brush assembly 20 to slip ring assembly 30 will be explained more fully with reference to FIGS. 2 through 5. A fuller description of brush assembly 20 is presented in copending application Ser. No. 236,276 entitled AN IMPROVED BRUSH ASSEMBLY FOR A ROTATING ICE PROTECTION SYSTEM, filed the same day as this application, by Michael J. Giamati and Tommy M. Wilson (the Brush Assembly Application) issued Dec. 26, 1995, as U.S. Pat. No. 5,479,060. Other brush assemblies are also suitable for use with the invention such as those described in U.S. Pat. No. 4,136,295 issued on Jan. 23, 1979, to David B. Sweet.

Still referring to FIG. 1, the slip ring assembly 30 is attached to the spinner bulkhead 14 and a propeller hub 16 by several mounting screws 18. The propeller assembly 10 is attached to the engine 12 by several bolts (not shown) that attach engine drive shaft 13 to propeller hub 16. A spinner dome 15 attaches to bulkhead 14 and serves as a streamlined cover for the hub 16 and other components within the dome. A plurality of propeller blades 32 are mounted to the propeller hub 16. Ice protection means are mounted to the propeller for conserving propeller performance in atmospheric icing conditions. Here, such ice protection means comprise electrothermal propeller de-icers 38 that are attached to the leading edges of the propeller blades 32 as is well known in the art. De-icers 38 conserve propeller performance in atmospheric icing conditions by periodically removing ice accumulations. This is accomplished by periodically applying an electrical potential and current to electrothermal heaters within de-icers 38. Thus, the ice protection means constitute an electrical load mounted on the propeller.

A counterweight 34 is attached to the propeller blade 32. A wire harness 36 is shown attached to the counterweight 34. De-icer leads 40 wrap around beneath the counterweight and attach to terminal strip 42. The wire harness 36 also attaches to terminal strip 42 and serves to transfer electrical power from slip ring 30 to the de-icer leads 40. The other end of the wire harness (not shown) is attached to the back of the bulkhead 14 and connects to power leads (not shown) from the slip ring assembly 30. Thus, the plurality of slip rings are electrically connected to the ice protection means. Such arrangements for transferring power from a slip ring assembly to a propeller de-icer 38 are well known in the art.

Figure 2A:
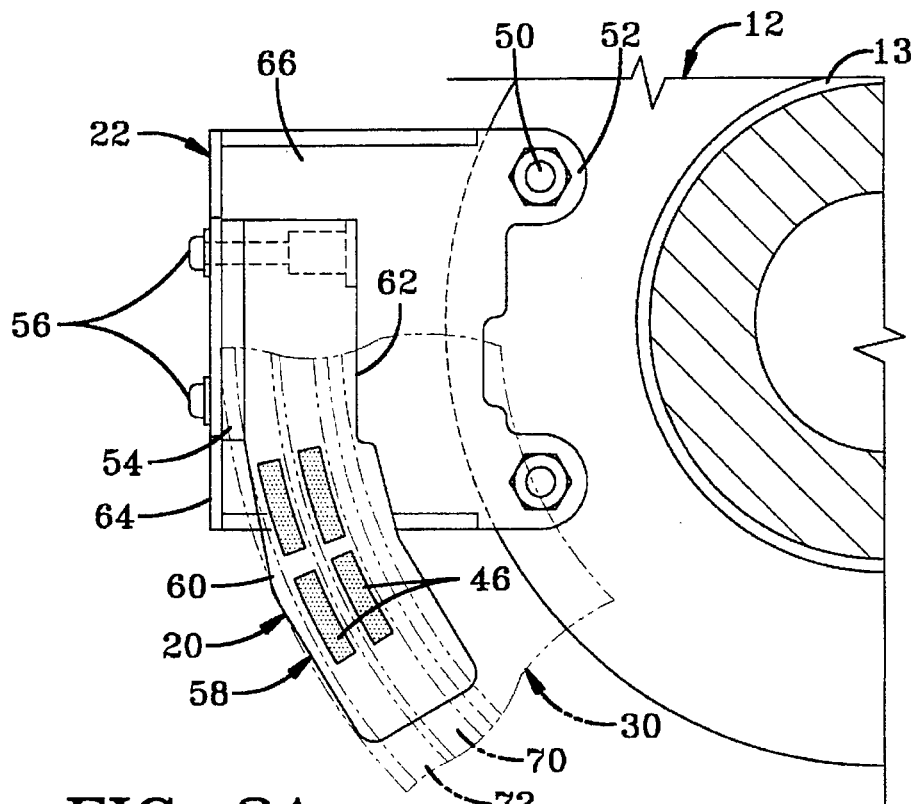
FIG. 2A presents a detailed view of the brush assembly mounting arrangement according to the invention as seen facing the front of the engine along line 2A—2A of FIG. 1.

Referring now to FIG. 2A, mounting bracket 22 is attached to the front of engine 12 at two locations. Mounting bracket 22 has a bracket cantilever 64 that extends from a bracket flange 66. The engine cover plate studs 50 and cover plate nuts 52 are conveniently used to mount the mounting bracket flange 66 to the engine in two locations. Brush assembly 20 includes a housing 58 that comprises a brush enclosure 60 and an attachment leg 62 that extends from brush enclosure 60. Mounting screws 56 pass through the bracket cantilever 64 and engage attachment leg 62. This is known as an "inside" mounting arrangement because the brush assembly 20 is mounted between the bracket cantilever 64 and the engine drive shaft 13. A spacer 54 is located between mounting bracket 22 and attachment leg 62 in order to radially align brushes 46 with slip rings 70 and 72 (shown in phantom).

A plurality of electrically conductive brushes 46 for conducting electrical power to the slip rings are slidably received within a plurality of apertures in the brush enclosure 60. The brushes are shown as having a rectangular cross-section, but other cross-sectional shapes could work equally well in the practice of the invention, such as round or polygonal. The brushes must be in alignment with the slip rings. Biasing means are provided for urging each brush against a slip ring. Thus, brushes 46 and slip rings 70 and 72 form a plurality of sliding contacts. Electrical power is conducted from the brushes 46 of fixed brush assembly 20 through the plurality of sliding contacts to the rotating slip rings 70 and 72 of slip ring assembly 30. Electrical power is conducted during sliding movement of the slip ring relative to the brush. The brush assembly 20 and slip ring 30 are often mounted in a location where they are subjected to oil contamination. Thus, the sliding contacts may be subjected to oil contamination during the aforementioned sliding movement. The oil contamination may originate from many sources, but most often originates from the propeller drive means or engine 12. A sliding contact according to the invention exhibits superior performance in this type of environment.

Figure 2B:
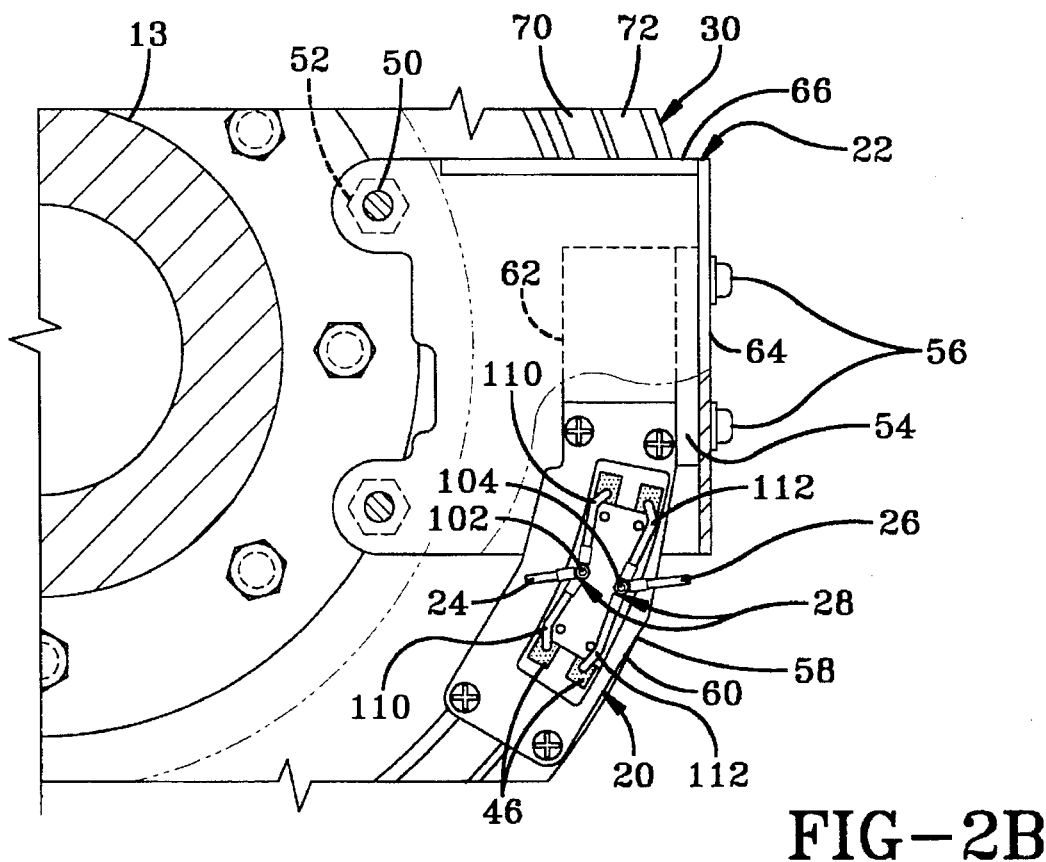
FIG. 2B presents a detailed view of the brush assembly mounting arrangement according to the invention from the back of the mounting bracket as seen facing the propeller assembly along line 2B—2B of FIG. 1.

Referring now to FIG. 2B, a power connection means 28 for electrically connecting the brush assembly to the power supply system is attached to the back of housing 58 where power leads 24 and 26 are connected. The power connection means includes two electrical connectors which, here, are two conductive studs 102 and 104. Electrical power is transferred from the power connection means 28 to the brushes 46 by jumper means which, here, are flexible shunts 110 and 112. Note that there is at least one flexible shunt per brush that electrically connects each brush that aligns with a single slip ring to the electrical connector 102 and 104 corresponding to that slip ring. Electrical power is conducted from the brushes 46 of fixed brush assembly 20 to the rotating slip rings 70 and 72 of slip ring assembly 30 through a sliding contact formed between each brush and slip ring.

Figure 3A:
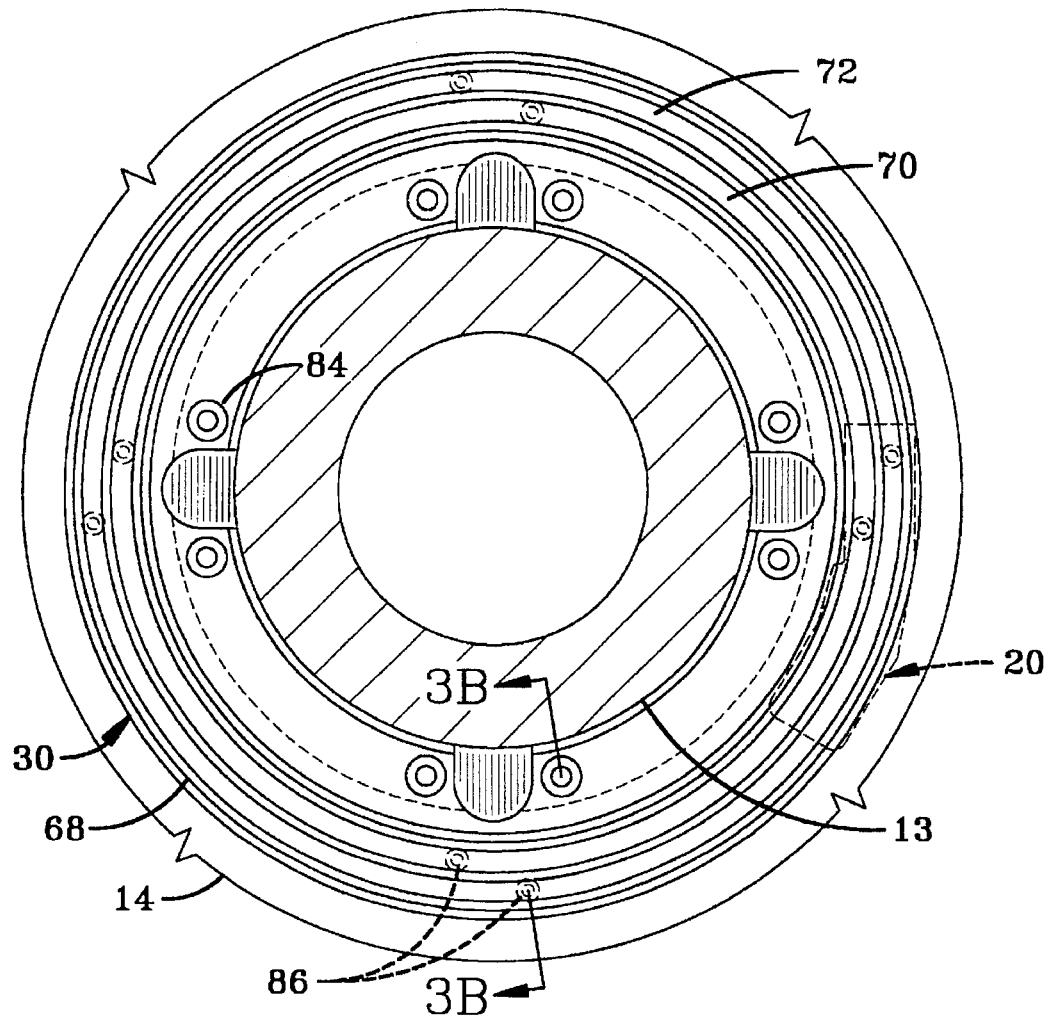
FIG. 3A presents a view of a slip ring assembly taken along line 3A—3A of FIG. 1.
Figure 3B:
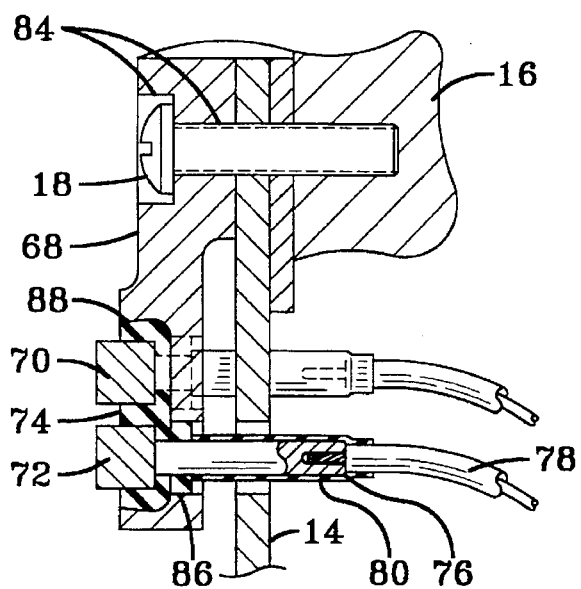
FIG. 3B presents a cross-sectional view of the slip ring assembly along line 3B—3B of FIG. 3A.

Referring to FIGS. 3A and 3B, more detailed views of the slip ring assembly 30 are presented. FIG. 3A presents a plan view of slip ring assembly 30 and FIG. 3B presents a sectional view of slip ring assembly 30 taken along line 3B—3B of FIG. 3A. A phantom outline of brush assembly 20 depicts the orientation of brush assembly 20 relative to slip ring assembly 30. Slip ring assembly 30 includes a slip ring holder 68 and slip rings 70 and 72 set into slip ring channel 88. Slip ring holder 68 may be manufactured from any material having suitable strength, preferably an aluminum alloy. Mounting holes 84 pass through the holder 68 at several locations. Mounting screws 18 pass through mounting holes 84 and attach the slip ring holder 68 to the propeller hub 16. A suitable epoxy potting compound 74 bonds the rings 70 and 72 into the channel 88 and also provides the necessary dielectric insulation between the individual rings 70 and 72 and the holder 68.

The slip rings are adapted to be electrically connected to the electrical load mounted on the propeller as follows. Conductive studs 76 (only one shown) are spot welded to each ring and pass through several stud holes 86 in the holder 68. One stud is provided on each ring for each de-icer mounted on a propeller blade. A slip ring lead 78 is soldered into a hole in the stud 76. A stud insulation sleeve 80 insulates stud 76 and slip ring lead 78 where it is soldered to the stud 76. The slip ring lead 78 may then be attached to the wire harness 36 of FIG. 1.

Brush assembly 20 of FIG. 2A has four brushes, the plurality of apertures receiving two brushes 46 in alignment with one with slip ring 70 and two brushes in alignment with another slip ring 72. Utilizing multiple brushes per ring is advantageous in a high current system. Total current draw carried by a single brush that exceeds about 25–30 amps is generally considered to be a high current system. Multiple brushes split the current draw and reduce the current draw carried by the individual brushes. The maximum recommended current density per brush is a function of the brush compound and operating conditions. In lower current systems, a single brush per ring may be desirable. Multiple slip rings may also be desirable depending on the application. A propeller ice protection system normally utilizes at least two rings. However, three ring systems are common, and four ring systems are known. Any such variations are considered to be within the purview of the invention.

Sliding contacts used in prior propeller ice protection systems have shown a tendency to wear faster in the field than under bench conditions in the laboratory. Some aircraft have exhibited more of a problem with sliding contact wear than others. The cause of increased brush and slip ring wear in propeller ice protection systems has eluded detection. Applicant unexpectedly discovered that oil contamination of the sliding contact greatly increases slip ring wear, and seems to account for the discrepancy between field wear and laboratory wear. Even very small quantities of oil contamination can quickly increase brush and slip ring wear to unacceptable levels. Oil contamination of a sliding contact is known in the sliding contact art as being very undesirable. The generally recognized solution in the sliding contact art is to keep the sliding contact clean. However, oil often occupies the environment of a propeller ice protection system and contaminates the brush and slip ring assemblies. Oil may be introduced from leakage in the engine or gear box seals and from other sources. Keeping the sliding contact clean by protecting it from oil contamination is generally impractical in a propeller ice protection system. Previous workers in the propeller ice protection art have apparently failed to recognize the problem, and that brush and slip ring wear can be optimally minimized for service in an oil contaminated environment.

Figure 4:
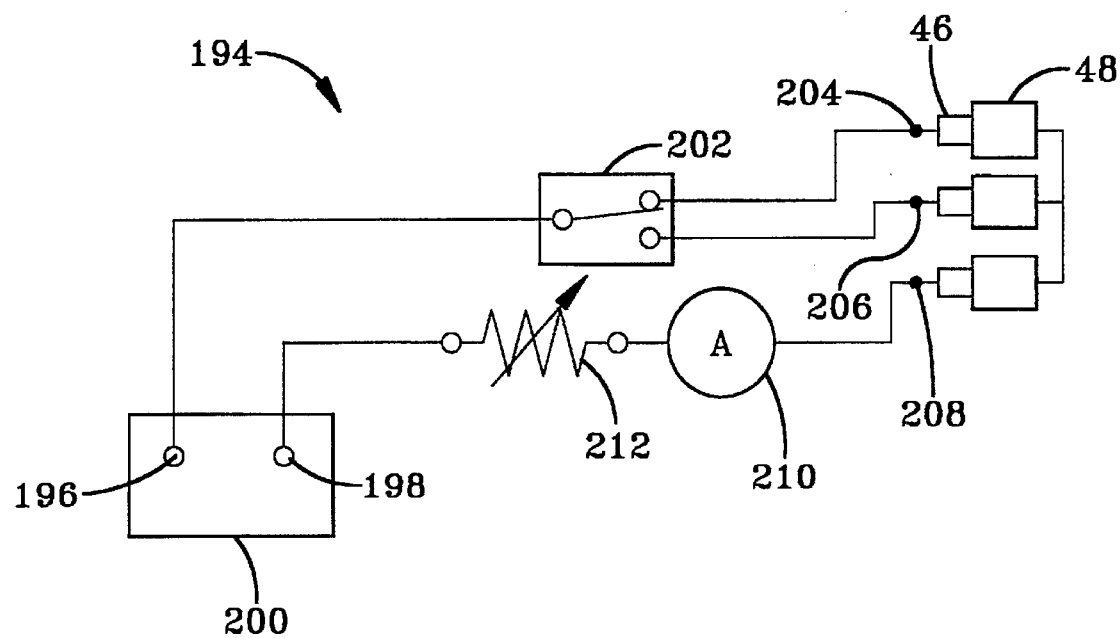
FIG. 4 presents an electrical schematic of a test device used for testing brush and slip ring conditions in a simulated propeller environment.

In order to minimize wear in an oil contaminated environment, the brush compound and ring alloy must be chosen such that certain desired properties are attained. FIG. 4 presents a schematic diagram of three-ring test device 194 used to test brush and slip ring combinations in a simulated propeller environment. Node 196 of power supply 200 is electrically connected to a timer/switch 202 that is electrically connected to nodes 204 and 206. Nodes 204 and 206 are electrically connected to brushes 46 which form a plurality of sliding contacts with slip rings 48. Slip rings 48 are jumpered together so such that slip rings 48 are equipotential. One of brushes 46 is electrically connected to node 208 which is electrically connected to an ammeter 210, a resistive load bank 212 that simulates the resistive electrical load of an ice protection system, and node 198 on power supply 200. Slip rings 48 are mounted in a slip ring assembly, such as slip ring assembly 30 of FIGS. 3A and 3B. The slip ring assembly is rotated by an alternating current motor (not shown) that drives the slip ring assembly at a fixed predetermined rotational speed. Brushes 46 are mounted in a brush assembly, such as brush assembly 20 of FIGS. 2A, 2B, and 2C. Brush assembly 20 is mounted to a bracket which, in turn, is mounted to a base (not shown) that supports the motor. Power supply 200 may produce either an alternating current or a direct current in the circuit.

A test is commenced by activating the motor which rotates the slip ring assembly at the fixed predetermined rotational speed. The power supply 200 is then activated which places a potential across nodes 196 and 198 that develops a current in the circuit. Power supply 200 may produce either an alternating current or a direct current in the circuit. Most propeller de-ice systems are supplied by either 28 VDC or 115 VAC, 400 Hz. power supplies. Timer/switch 202 switches the circuit between nodes 204 and 206 in a predetermined timed sequence that simulates the switching sequence of the propeller ice protection system. A two ring system may be tested by disconnecting node 204 and eliminating the corresponding brush and slip ring.

The sliding contact may be subjected to oil contamination according to the following procedure. The power supply is deactivated and the and the motor driving the slip ring assembly is stopped. A small quantity of oil is applied to the ring contact surface completely around the circumference of the ring. The test is resumed following application of the oil. The quantity of oil applied should be less than one milliliter, but partly depends on the size of the slip ring. A quantity of one-half milliliter is preferred for most slip rings, but can be as little as one-quarter milliliter. A period of 24 hours between applications is preferred to allow sludge to build up on the slip rings. Periodically applying small quantities produces brush and slip ring wear that appears to accurately reflect wear noted in the field under actual operating conditions.

Testing with this device has demonstrated that oil contamination plays a major role in brush and slip ring wear, and that such wear may be minimized while maintaining an acceptable brush/ring voltage drop by selecting a brush and slip ring with certain properties. According to an aspect of the invention, a brush comprised of a carbonaceous matrix having a desired silver content forms a sliding contact with a copper alloy slip ring having a hardness of at least a Rockwell B60. The lower limit for silver content is on the order of 45% by weight, but silver content is preferably more than 55% by weight. The upper limit for silver content is on the order of 70% by weight, but silver content is preferably less than 65% by weight. Thus, silver content must be on the order of 45% to 70% by weight, is preferably on the order of 55% to 65% by weight, and is most preferably on the order of 60% by weight. Ring hardness is at least a Rockwell B60, is preferably at least a Rockwell B70, more preferably at least a Rockwell B80, and most preferably on the order of a Rockwell B85 to B95. A sliding contact according to the invention exhibits greatly reduced slip ring and brush wear in a propeller ice protection system, especially when subjected to oil contamination. Slip ring and brush life is preferably in excess of 1800 hours.

There are two types of metal-graphite brushes. The first type is formed by preparing a mixture of graphite and metal powder and bonding the mixture into a brush. The second type is formed by impregnating an already formed porous carbonaceous matrix with molten metal. The term "impregnated" as used herein is intended to refer to the second type. The second type is preferred in the practice of the invention, with an electrographitic carbonaceous matrix impregnated with silver being especially preferred. An impregnated brush appears to have better electrical properties, including a lower resistance and brush/ring voltage drop, than brushes metallized according to other processes.

Brush/ring voltage drop in the circuit due to the sliding contact is another important parameter. Voltage drop is essentially a combination of contact drop at the sliding contact and potential drop due to brush resistance. A brush/ring voltage drop may be measured in circuit 194 by measuring the difference in potential across nodes 204 and 208, or by measuring the difference in potential across nodes 206 and 208. Brush/ring voltage drop is preferably less than 2 volts (DC) at 35.5 amps (DC) in a propeller ice protection system. Each brush 46 of FIG. 4 can actually include two or more brushes in parallel, for example, if more than one brush rides on a single slip ring. In such cases, exact brush arrangement may vary as long as the brush/ring voltage drop meets the 2 volt (DC) at 35.5 amp requirement.

A silver graphite brush compound for high altitude use having a silver content of 60% by weight is preferred in the practice of the invention, such as grade DO silver graphite available from National Electrical Carbon Corporation, Greenville, S.C., U.S.A., having properties as described in a "Grade Data Sheet" published by that company. A high altitude brush compound appears to be advantageous because of its increased ability to maintain a slip ring surface film. A phosphor bronze ring compound is preferred such as Copper Development Association alloy C51000 (copper 94.8%, tin 5%, phosphorus 0.02%) hardened to a Rockwell B85–B95. Testing demonstrated that this combination exhibits projected brush and slip ring life in excess of 1800 hours with brush/ring voltage drop less than 2 VDC at 35.5 amps DC in a 28 VDC system and contaminated with one-half milliliter of turbine oil (military specification MIL-L-23699) once approximately every 24 hours.

Forming and maintaining a slip ring surface film is very important in order maximize brush and slip ring life. Testing with this combination indicates that a slip ring surface film forms while conducting electrical power from the brushes to the slip rings through the sliding contacts. The surface film formed even when the slip rings were intermittently contaminated with oil as previously described. Further, the slip ring surface film was maintained while the slip rings and brushes were being subjected to oil contamination.

Figure 5:
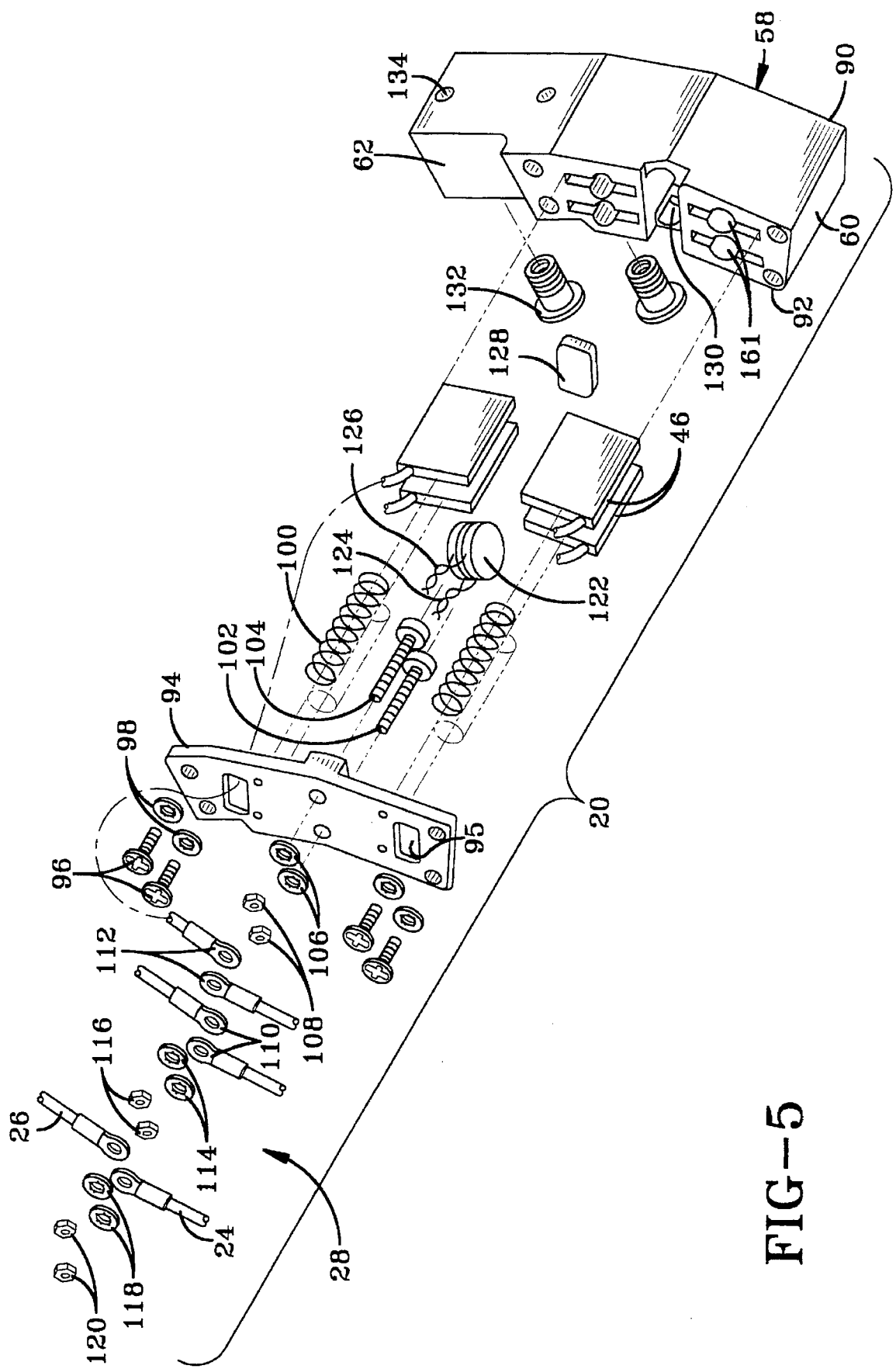
FIG. 5 presents an exploded isometric view of a brush assembly useful in practicing the invention.

Referring to FIG. 5, a detailed exploded view is presented of brush assembly 20 for use in the conditions previously described (projected brush and slip ring life in excess of 1800 hours with brush/ring voltage drop less than 2 VDC at 35.5 amps DC in a 28 VDC system). However, it is important to note that a sliding contact according to the invention may be used with practically any type of brush assembly adapted for use in a propeller ice protection system. Brush assembly 20 is described more fully in the Brush Assembly Application. Brush enclosure 60 and attachment leg 62 preferably form brush assembly housing 58 as an integral unit. Brush enclosure 60 is most preferably molded in one piece from an appropriate fiber reinforced plastic molding compound. Examples of suitable molding compounds include chopped fiberglass reinforced polyester or epoxy resin with fire retardant qualities. Suitable molding compounds and techniques are known in the art. Brush enclosure 60 is formed with a plurality of apertures 61 that slidably receive a plurality of brushes 46. Brush enclosure 60 also has a first surface 90 that faces the slip ring assembly (not shown) and an opposing second surface 92 spaced from the first surface 90.

Brush assembly housing 58 also comprises a lid 94 that is removably affixed to the second surface 92 at four locations with lid screws 96 and lock washers 98. Biasing means must be provided to bias the brushes 46 against the slip rings (not shown). Here, such biasing means includes a plurality of helical springs 100 disposed in compression between the lid 94 and the brushes 46. At least one spring 100 must be provided for each brush 46. The springs 100 are received within the apertures in the brush enclosure. Other types of springs may be equally suitable in the practice of the invention. Performance of brush assembly 20 may be further enhanced by selecting a helical spring having a minimized spring constant, as described in the Brush Assembly Application. Also, spring diameter is preferably maximized in order to minimize brush tip, as described in the Brush Assembly Application.

Referring still to FIG. 5, power connection means 28 is attached to the top of lid 94. Here, the power connection means comprises two electrical connectors or studs 102 and 104 that are threaded into and fixed to the lid 94. Lock washers 106 and nuts 108 lock the studs 102 and 104 in place. At least one electrical connector must correspond to each slip ring. For example, more than one stud per slip ring could be provided, in which case a group of studs corresponding to a single slip ring would constitute a single electrical connector. Likewise, a male or female shell-type connector having a plurality of connectors could be attached to the lid 94.

Regardless of the type of power connection means 28 utilized, some type of jumper means for transferring electrical power from the power connection means 28 to the plurality of brushes 46 is required. Here, such jumper means comprise flexible shunts 110 and 112. Flexible shunts 110 and 112 are formed from an insulated multiple stranded wire. One end of each shunt is preferably integrally formed into the corresponding brush 46. The other end of the shunt passes through an aperture 95 in lid 94 and is preferably terminated in a ring terminal that is clamped to one of studs 102 and 104 using lock washers 114 and nuts 116. Note that at least one flexible shunt 110 or 112 per brush is provided that electrically connects each brush aligned with a single slip ring to the electrical connection 102 or 104 corresponding to that slip ring. For example, two of brushes 46 that align with a single slip ring (see FIG. 2A) are connected to a first electrical connector 102 via flexible shunts 110. The two brushes that align with the other slip ring (see FIG. 2A) are connected to a second electrical connector 104 via flexible shunts 112. Other shunt and terminal arrangements are possible without departing from the scope of the invention. Lock washers 118 and nuts 120 are provided for attaching system power or ground leads 24 and 26, as required, to electrical connectors 102 and 104, as depicted in FIGS. 1 and 2B.

Still referring to FIG. 5, a transient voltage suppressor means 122 is connected across first and second electrical connectors 102 and 104, and is disposed within the housing. The transient voltage suppressor prevents feedback of high potential induced by lightning strike into the power system by shunting the high potential to ground. A cavity 130 is provided within housing 58 for receiving the transient voltage suppressor 122. A resilient pad 128 is disposed inside cavity 130 within housing 58 and restrains the transient voltage suppressor 122 against vibration. The transient voltage suppressor does not have an effect on sliding contact performance, and is not necessary for all applications. A more complete description is provided in the Brush Assembly Application.

Apertures 134 in attachment leg 62 are provided for mounting brush assembly to a mounting bracket. Metallic inserts 132 are provided aligned with apertures 134 for receiving mounting screws (screws 56 of FIGS. 2A and 2B). Each insert 132 is internally threaded to engage a mounting screw and is also engaged against rotation to the attachment leg 62. Screws are passed through holes in the mounting bracket and inserted through apertures 134 into engagement with inserts 132. In such manner, attachment leg 62 of brush assembly 20 is clamped against the mounting bracket.

Figure 6:
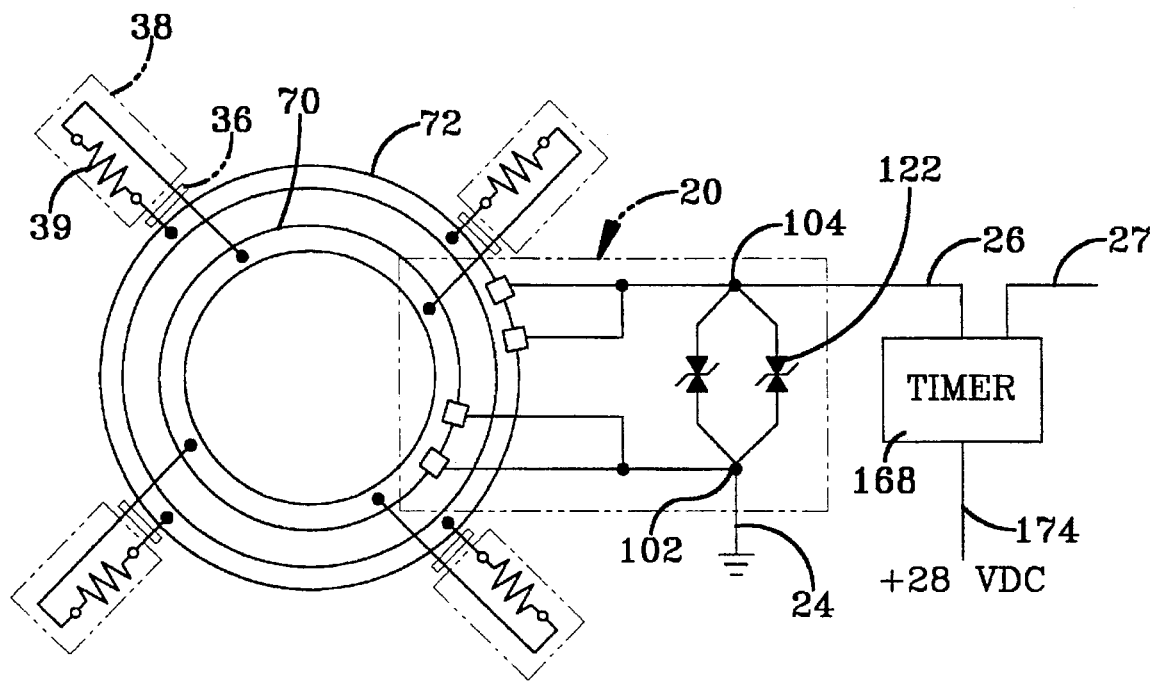
FIG. 6 presents an electrical schematic of an electrothermal propeller de-icing system utilizing the invention.

An electrical schematic of a representative propeller ice protection system is presented in FIG. 6. Only one propeller ice protection system corresponding to one engine is shown, the system corresponding to the other engine being a mirror image. The power supply system comprises a timer 168 electrically connected to an aircraft power bus via power line 174 which in this example supplies 28 VDC to the timer. A circuit breaker (not shown) and an ammeter (not shown) for monitoring system current may also be provided in series with the power line 174. Timer 168 switches electrical power from power line 174 to the individual electrical leads lines 26 and 27 are routed to each brush assembly. Timer 168 switches power to lines 26 and 27 in a predetermined timed sequence. Ring 72 is connected to electrical leads 26 through brush assembly 20. Ring 70 is connected to ground lead 24 through brush assembly 20. Ground lead 24 may also be routed through the timer. Power is transferred to resistive heaters 39 within de-icers 38 through flexible wire harnesses 36. Transient voltage suppressor 122, here an MOV, is shown connected across power line 26 and ground line 24 where the lines are connected to the brush assembly 20. With this arrangement, the transient voltage suppressor 122 may shunt any high potential in line 26 induced by lightning strike to ground line 24 as previously described. Though shown transferring power to resistive heaters, the invention would be useful in transferring power to any electrical load mounted on an aircraft propeller.

It is evident that many variations are possible without departing from the true scope and spirit of the invention as defined by the claims that follow.

I claim:

1. A device for transferring electrical power from an electrical power supply mounted on an aircraft to an electrical load mounted on an aircraft propeller, comprising:

a slip ring assembly configured for attachment to the aircraft propeller, said slip ring assembly having a plurality of slip rings comprised of a copper alloy having a surface hardness of at least a Rockwell B60, said plurality of slip rings being adapted to be electrically connected to the electrical load; and, a brush assembly configured for attachment to the aircraft, said brush assembly having a plurality of electrically conductive brushes for conducting electrical power to the slip rings with at least one brush per slip ring, each brush being comprised of a carbonaceous matrix impregnated with silver on the order of 45% to 70% by weight, a plurality of springs with at least one spring per brush for urging each brush against a slip ring, a housing with a plurality of apertures for receiving said plurality of springs and for slidably receiving said plurality of brushes in alignment with said slip rings, a plurality of electrical connectors attached to said housing for connection with the power supply with at least one electrical connector corresponding to each slip ring, and a plurality of flexible shunts with at least one flexible shunt per brush that electrically connects each brush that aligns with a single slip ring to said electrical connector corresponding to that slip ring.

2. The device of claim 1, wherein said carbonaceous matrix is electrographitic.

3. The device of claim 1, wherein said silver is on the order of 55% to 65% by weight.

4. The device of claim 1, wherein said surface hardness is at least a Rockwell B70.

5. The device of claim 4, wherein said silver is on the order of 55% to 65% by weight.

6. The device of claim 5, wherein said surface hardness is at least a Rockwell B80.

7. The device of claim 1, wherein said silver is on the order of 60% by weight.

8. The device of claim 7, wherein said surface hardness is on the order of a Rockwell B85 to B95.

9. The device of claim 1, wherein said copper alloy comprises on the order of 94.8% copper, 5% tin, and 0.02% phosphorus.

10. The device of claim 9, wherein said copper alloy is hardened.

11. An apparatus for propelling an aircraft through atmospheric icing conditions, comprising:

propeller drive means mounted to the aircraft for driving an aircraft propeller;

an aircraft propeller driven by said propeller drive means;

ice protection means mounted to said propeller for conserving propeller performance in atmospheric icing conditions;

an electrical power supply mounted to the aircraft;

a slip ring assembly mounted to said aircraft propeller having a plurality of slip rings comprised of a copper alloy having a surface hardness of at least a Rockwell B60, said plurality of slip rings being electrically connected to said ice protection means; and, a brush assembly mounted to the aircraft proximate said propeller drive means and facing said slip ring assembly, said brush assembly having a plurality of brushes comprised of a carbonaceous matrix impregnated with silver on the order of 45% to 70% by weight, said plurality of brushes being electrically connected to said electrical power supply, and means for biasing said plurality of brushes in contact with said plurality of slip rings.

12. The apparatus of claim 11, wherein said carbonaceous matrix is electrographitic.

13. The apparatus of claim 11, wherein said silver is on the order of 55% to 65% by weight.

14. The apparatus of claim 11, wherein said surface hardness is at least a Rockwell B70.

15. The apparatus of claim 14, wherein said silver is on the order of 55% to 65% by weight.

16. The apparatus of claim 15, wherein said surface hardness is at least a Rockwell B80.

17. The apparatus of claim 11, wherein said silver is on the order of 60% by weight.

18. The apparatus of claim 17, wherein said surface hardness is on the order of a Rockwell B85 to B95.

19. The apparatus of claim 11, wherein said copper alloy comprises on the order of 94.8% copper, 5% tin, and 0.02% phosphorus.

20. The apparatus of claim 19, wherein said copper alloy is hardened.

21. The apparatus of claim 11, wherein said slip ring assembly and brush assembly are mounted at a location subjected to oil contamination.

22. The apparatus of claim 21, wherein said oil contamination is induced by said propeller drive means.

23. A sliding contact for conducting electrical power from an electrical power supply mounted on an aircraft to a propeller having an electrical load, comprising:

a slip ring comprised of a copper alloy having a hardness of at least a Rockwell B60, said slip ring being adapted to attach to the propeller and conduct electrical power to the electrical load; and, a brush comprised of a carbonaceous matrix with a silver content on the order of 45% to 70% by weight, said brush being adapted to receive electrical power from the power supply, said brush forming a contact with said slip ring that conducts electrical power from brush to said slip ring during sliding movement of said slip ring relative to said brush while being subjected to oil contamination.

24. The sliding contact of claim 23, wherein said carbonaceous matrix is electrographitic.

25. The sliding contact of claim 23, wherein said silver content is on the order of 55% to 65% by weight.

26. The sliding contact of claim 23, wherein said hardness is at least a Rockwell B70.

27. The sliding contact of claim 26, wherein said silver content is on the order of 55% to 65% by weight.

28. The sliding contact of claim 27, wherein said hardness is at least a Rockwell B80.

29. The sliding contact of claim 23, wherein said silver is on the order of 60% by weight.

30. The sliding contact of claim 29, wherein said hardness is on the order of a Rockwell B85 to B95.

31. The sliding contact of claim 23, wherein said copper alloy comprises on the order of 94.8% copper, 5% tin, and 0.02% phosphorus.

32. The sliding contact of claim 31, wherein said copper alloy is hardened.

33. A method for conducting electrical power from an aircraft to an electrical load mounted on a propeller, comprising the steps of:

conducting electrical power to a plurality of brushes slidably received within a brush assembly mounted to the aircraft facing a slip ring assembly mounted to the propeller at a location subjected to oil contamination, said plurality of brushes being comprised of a carbonaceous matrix with a silver content on the order of 45% to 70% by weight, said slip ring assembly having a plurality of slip rings comprised of a copper alloy having a surface hardness of at least a Rockwell B60, said brush assembly having biasing means for biasing said plurality of brushes against said plurality of slip rings thereby forming a plurality of sliding contacts;

conducting electrical power from said plurality of brushes to said plurality of slip rings through said plurality of sliding contacts; and, conducting electrical power from the plurality of slip rings to the electrical load.

34. The method of claim 33, wherein said plurality of sliding contacts are subjected to oil contamination.

35. The method of claim 33, wherein said carbonaceous matrix is electrographitic.

36. The method of claim 33, wherein said silver content is on the order of 55% to 65% by weight.

37. The method of claim 33, wherein said surface hardness is at least a Rockwell B70.

38. The method of claim 37, wherein said silver content is on the order of 55% to 65% by weight.

39. The method of claim 38, wherein said surface hardness is at least a Rockwell B80.

40. The method of claim 33, wherein said silver content is on the order of 60% by weight silver.

41. The method of claim 40, wherein said surface hardness is on the order of a Rockwell B85 to B95.

42. The method of claim 33, wherein said copper alloy comprises on the order of 94.8% copper, 5% tin, and 0.02% phosphorus.

43. The method of claim 42, wherein said copper alloy is hardened.

44. The method of claim 33, wherein the step of conducting electrical power from said plurality of brushes to said plurality of slip rings through said plurality of sliding contacts further comprises the step of forming a slip ring surface film.

45. The method of claim 44, wherein the step of conducting electrical power from said plurality of brushes to said plurality of slip rings through said plurality of sliding contacts further comprises the step of maintaining said slip ring surface film while said plurality of slip rings and plurality of brushes are being subjected to oil contamination.

* * * * *